(12) United States Patent
Grant et al.

(10) Patent No.: US 7,581,490 B2
(45) Date of Patent: Sep. 1, 2009

(54) COFFEEMAKER WITH WATER FEED VELOCITY DECREASER

(75) Inventors: Anthony B. Grant, Weston, FL (US); Zakary E. Hartman, Coral Springs, FL (US); Charles J. Weyant, Jr., Lake Worth, FL (US)

(73) Assignee: Applica Consumer Products, Inc., Miramar, FL (US)

( * ) Notice: Subject to any disclaimer, the term of this patent is extended or adjusted under 35 U.S.C. 154(b) by 635 days.

(21) Appl. No.: 11/118,180

(22) Filed: Apr. 28, 2005

(65) Prior Publication Data

US 2006/0261190 A1 Nov. 23, 2006

(51) Int. Cl.
A47J 31/00 (2006.01)
(52) U.S. Cl. .............. 99/315; 99/312; 99/314
(58) Field of Classification Search .............. 99/295, 99/315, 304, 306, 307, 302 R, 312, 314
See application file for complete search history.

(56) References Cited

U.S. PATENT DOCUMENTS

| | | | | |
|---|---|---|---|---|
| 722,213 | A * | 3/1903 | Hart ........................... 99/306 |
| 1,963,476 | A | 6/1934 | Smith ........................... 210/67 |
| 3,085,880 | A | 4/1963 | Matty ........................... 99/71 |
| 3,333,964 | A | 8/1967 | Bender ......................... 99/713 |
| 3,490,356 | A | 1/1970 | Peterson et al. ............... 99/300 |
| 3,590,723 | A | 7/1971 | Dokos .......................... 99/289 |
| 3,626,839 | A | 12/1971 | Martin et al. .................. 99/315 |
| 3,935,805 | A | 2/1976 | Ihlenfeld ..................... 99/300 |
| 4,056,050 | A | 11/1977 | Brown ......................... 99/305 |
| 4,070,956 | A | 1/1978 | Brown ......................... 99/304 |
| 4,103,603 | A * | 8/1978 | Bergmann et al. ............ 99/294 |
| 4,143,589 | A * | 3/1979 | Weber ......................... 99/282 |
| 4,354,427 | A | 10/1982 | Filipowicz et al. ............ 99/307 |
| 4,414,884 | A * | 11/1983 | McLean ....................... 99/304 |
| 4,426,920 | A | 1/1984 | Phillips et al. ............... 99/307 |
| 4,464,982 | A | 8/1984 | Leuschner et al. ............ 99/287 |
| 4,545,296 | A | 10/1985 | Ben-Shmuel ................ 99/289 |
| 4,748,901 | A * | 6/1988 | Burmeister .................. 99/306 |
| 4,771,680 | A | 9/1988 | Snowball et al. ............. 99/295 |
| 4,779,520 | A | 10/1988 | Hauslein ...................... 99/287 |
| 4,858,523 | A | 8/1989 | Helbling ...................... 99/280 |
| 4,920,869 | A | 5/1990 | Landais ....................... 99/283 |
| 4,962,693 | A | 10/1990 | Miwa et al. .................. 99/283 |
| 4,983,412 | A | 1/1991 | Hauslein ..................... 426/238 |
| 5,265,517 | A | 11/1993 | Gilbert ........................ 99/280 |
| 5,340,597 | A | 8/1994 | Gilbert ........................ 426/433 |
| 5,477,775 | A | 12/1995 | Delhom et al. ............... 99/299 |
| 5,910,205 | A | 6/1999 | Patel ........................... 99/315 |
| 5,957,035 | A | 9/1999 | Richter ........................ 99/287 |
| 6,148,717 | A * | 11/2000 | Lassota ........................ 99/283 |
| 6,244,162 | B1 | 6/2001 | Dahmen ....................... 99/315 |
| 6,513,419 | B2 | 2/2003 | Huber et al. ................... 99/315 |

(Continued)

Primary Examiner—Reginald L Alexander
(74) Attorney, Agent, or Firm—King & Spalding L.L.P.

(57) ABSTRACT

A coffeemaker including a shower head comprising at least one first hole for dispensing water in a downward direction; and a diverter located below the shower head. The diverter includes at least one second hole for substantially gravity only feed of the water from the shower head in the downward direction towards a coffee grounds pod. The at least one second hole is horizontally offset relative to the at least one first hole to allow velocity of the water from the shower head to decrease before exiting the at least one second hole.

8 Claims, 10 Drawing Sheets

U.S. PATENT DOCUMENTS

| | | | |
|---|---|---|---|
| 6,755,119 B1 | 6/2004 | Lyall et al. | 99/315 |
| 6,772,676 B2 | 8/2004 | Lassota | 99/283 |
| 6,779,437 B2 | 8/2004 | Sachtleben | 99/305 |
| 6,817,279 B2 | 11/2004 | Leung et al. | 99/287 |
| 6,892,627 B2 * | 5/2005 | Lalanne-Eygun | 99/285 |
| 6,990,891 B2 * | 1/2006 | Tebo, Jr. | 99/295 |
| 2004/0194631 A1 | 10/2004 | Pope | 99/279 |

* cited by examiner

US 7,581,490 B2

COFFEEMAKER WITH WATER FEED VELOCITY DECREASER

BACKGROUND OF THE INVENTION

1. Field of the Invention

The invention relates to a brewing apparatus and, more particularly, to a system for decreasing velocity of water into a brewing chamber.

2. Brief Description of Prior Developments

U.S. Pat. No. 6,244,162 discloses a spray head for a coffee brewer for speeding up delivery of water under pressure to coffee grounds. U.S. Pat. No. 3,085,880 discloses a chamber to cause water to have a swirling, steeping action into coffee grounds. Coffeemakers are known which use single serve pouches or pods. These single serve coffeemakers use a pump and delivery of heated water under pressure to the coffee pod. Coffeemakers are also know which use drip-type water delivery of heated water onto loose coffee grounds in multi-serve coffee makers.

There is a desire to provide a single serve brewing apparatus which uses pods, but with a drip-type water delivery method rather than a pressurized water delivery method. However, there is still a desire to provide good quality brewed liquid in such a device.

SUMMARY OF THE INVENTION

In accordance with one aspect of the invention, a coffeemaker is provided including a shower head comprising at least one first hole for dispensing water in a downward direction; and a diverter located below the shower head. The diverter includes at least one second hole for substantially gravity only feed of the water from the shower head in the downward direction towards a coffee grounds pod. The at least one second hole is horizontally offset relative to the at least one first hole to allow velocity of the water from the shower head to decrease before exiting the at least one second hole.

In accordance with another aspect of the invention, a coffeemaker is provided comprising a shower head comprising at least one first hole for dispensing water in a downward direction; and a diverter located below the shower head. The diverter comprises a plurality of second holes for dispensing the water from the shower head in the downward direction towards a coffee grounds pod. The second holes are horizontally offset from the at least one first hole. The diverter is adapted to decrease velocity of the water from the shower head. The diverter provides substantially gravity only feed of the water from the second holes towards the coffee grounds pod.

In accordance with another aspect of the invention, a coffeemaker is provided comprising a shower head and a diverter. The shower head comprises a plurality of first holes, for dispensing water in a downward direction, and a pressure outlet separate from the first holes to release gas and steam pressure inside the shower head such that the water dispensed from the first holes is not substantially pushed by the pressure out of the first holes. The diverter is located below the shower head. The diverter comprises a plurality of second holes for dispensing the water from the shower head in the downward direction towards a coffee grounds pod. The second holes are horizontally offset relative to the first holes. The diverter is adapted to decrease velocity of the water from the shower head. The diverter provides substantially gravity only feed of the water from the second holes towards the coffee grounds pod.

BRIEF DESCRIPTION OF THE DRAWINGS

The foregoing aspects and other features of the invention are explained in the following description, taken in connection with the accompanying drawings, wherein.

DETAILED DESCRIPTION OF THE PREFERRED EMBODIMENTS

Figure 1:
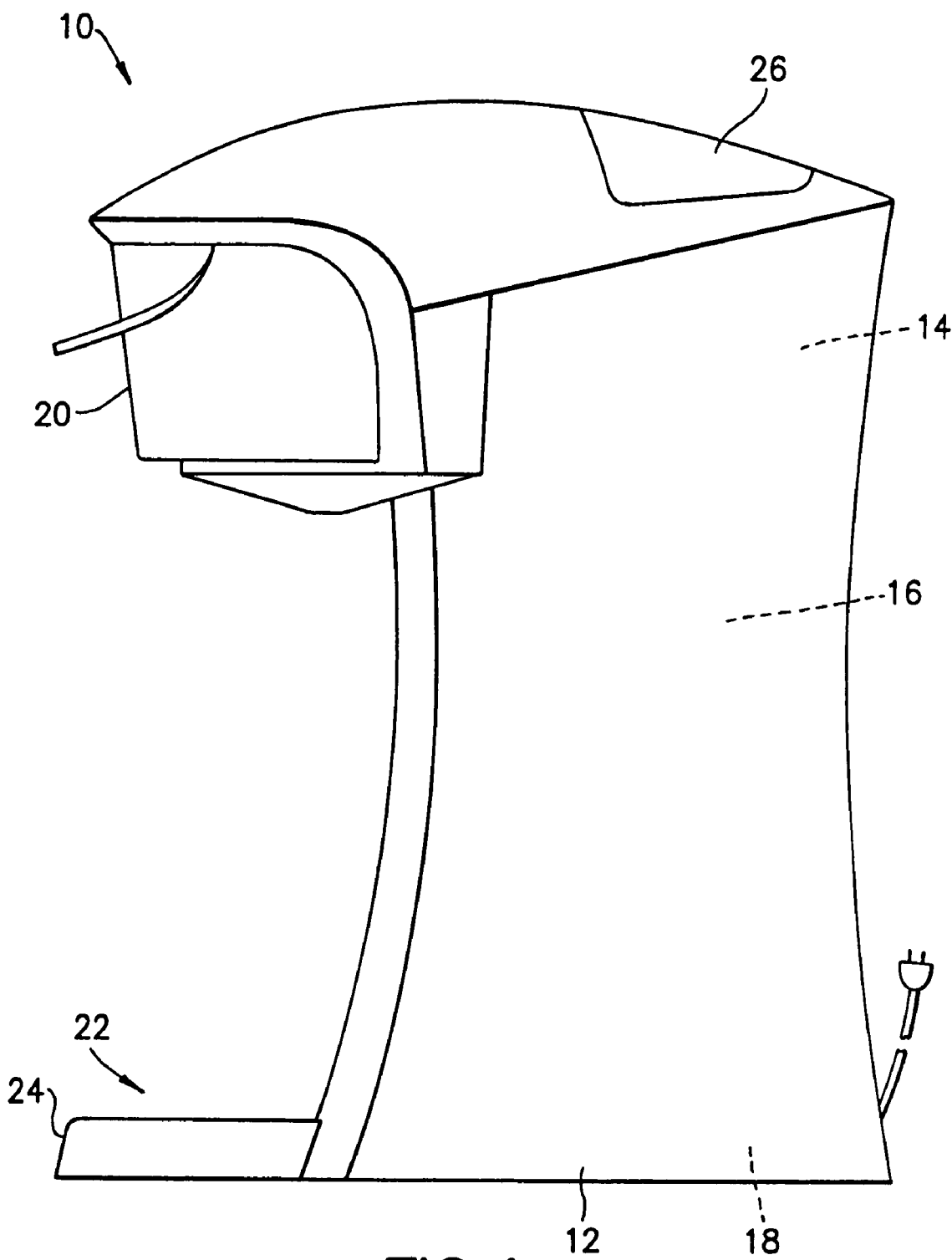
FIG. 1 is a side view of a brewing apparatus comprising features of the invention.

Referring to FIG. 1, there is shown a side view of a brewing apparatus 10 incorporating features of the invention. Although the invention will be described with reference to the exemplary embodiments shown in the drawings, it should be understood that the invention can be embodied in many alternate forms of embodiments. In addition, any suitable size, shape or type of elements or materials could be used.

Figure 2:
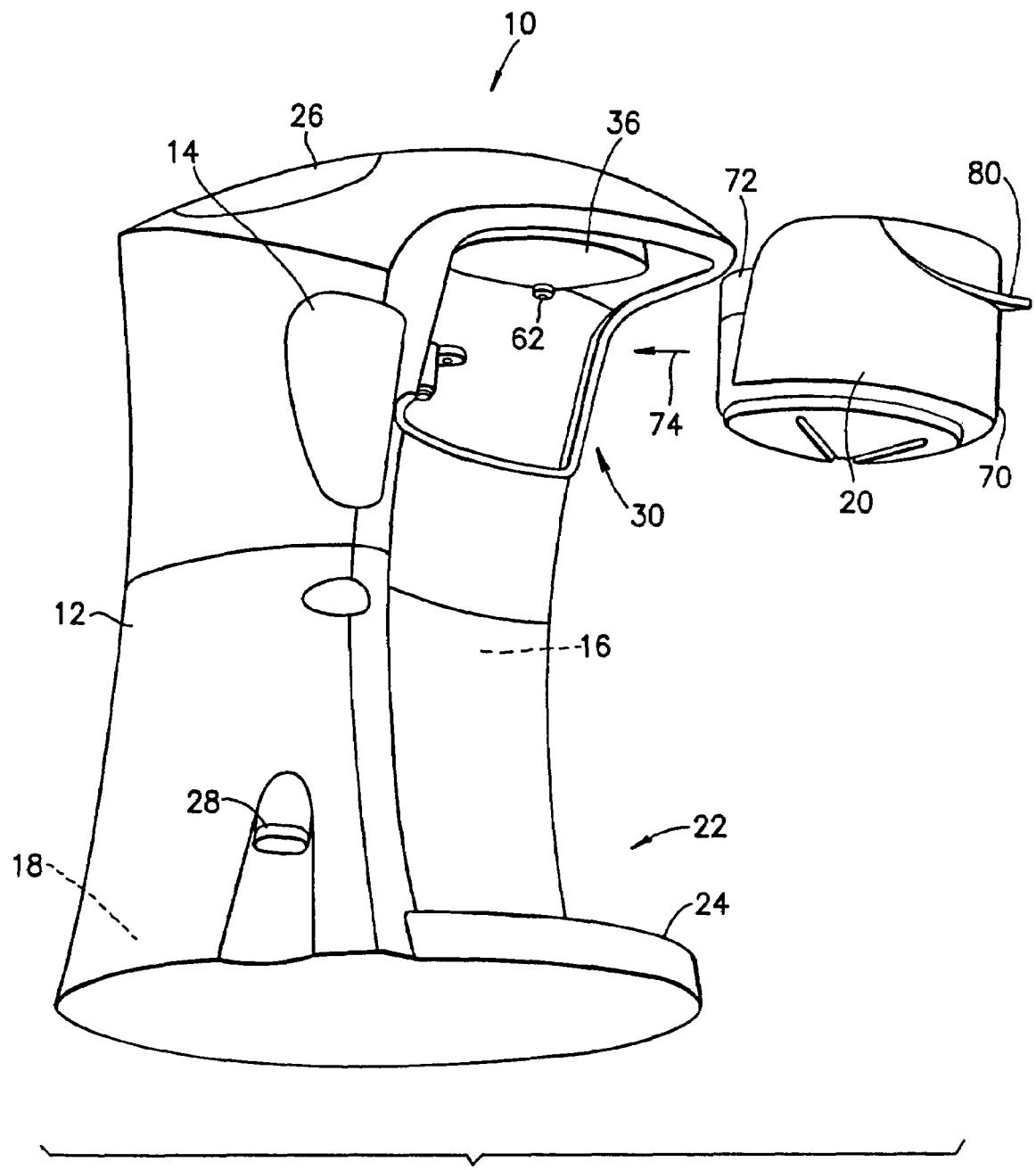
FIG. 2 is a perspective view of the brewing apparatus shown in FIG. 1.

Referring also to FIG. 2, the brewing apparatus in this embodiment comprises a coffeemaker. However, in alternate embodiments the brewing apparatus could be adapted for other brewed products such as tea brewing for example. The coffeemaker 10 generally comprises a housing 12, a water reservoir 14, a water heater 16, a controller 18, and a brewing chamber 20. The housing 12 could comprise any suitable shape. However, in this embodiment the housing is adapted to locate a cup or mug in area 22 on a platform 24 for receiving brewed coffee from the brewing chamber 20. The housing 12 is adapted to be stabile located on a flat surface, such as a kitchen countertop for example. The water reservoir 14 can be removable from the housing 12 in order to fill the reservoir with water. Alternatively, the reservoir could be non-removable and water can be pored into the reservoir through a movable top lid 26 of the housing.

The water heater 16 is an electrical water heater which is adapted to heat water from the water reservoir 14 and deliver the heated water for entry into the brewing chamber. The controller 18 preferably comprises a printed circuit board with a processor. An ON switch 28 is connected to the controller and is provided to activate a brewing cycle. However, in alternate embodiments any suitable user interface (UI) could be provided. The controller 18 can control the heater 16 and a pump if the coffeemaker comprises a water pump.

The brewing chamber 20, in this embodiment, is removably connected to the housing 12 at area 30. FIG. 1 shows the brewing chamber 20 mounted to the housing in area 30, and FIG. 2 shows the brewing chamber 20 in a removed position from the area 30. In an alternate embodiment the brewing chamber might merely be movable relative to the housing to insert and remove coffee pods; not necessarily removable.

Figure 3:
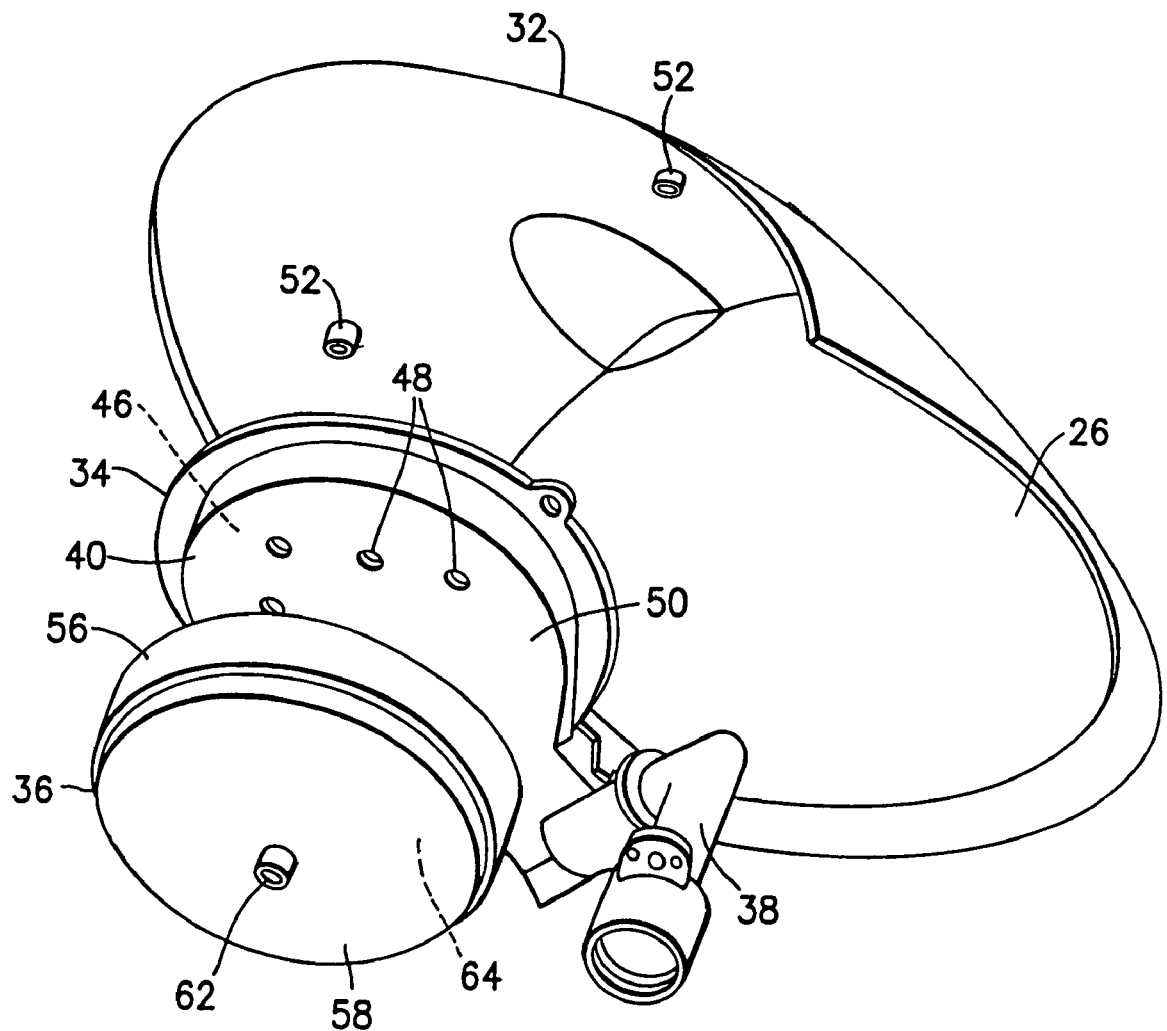
FIG. 3 is an exploded bottom perspective view of some of the components of the brewing apparatus shown in FIGS. 1 and 2.
Figure 4:
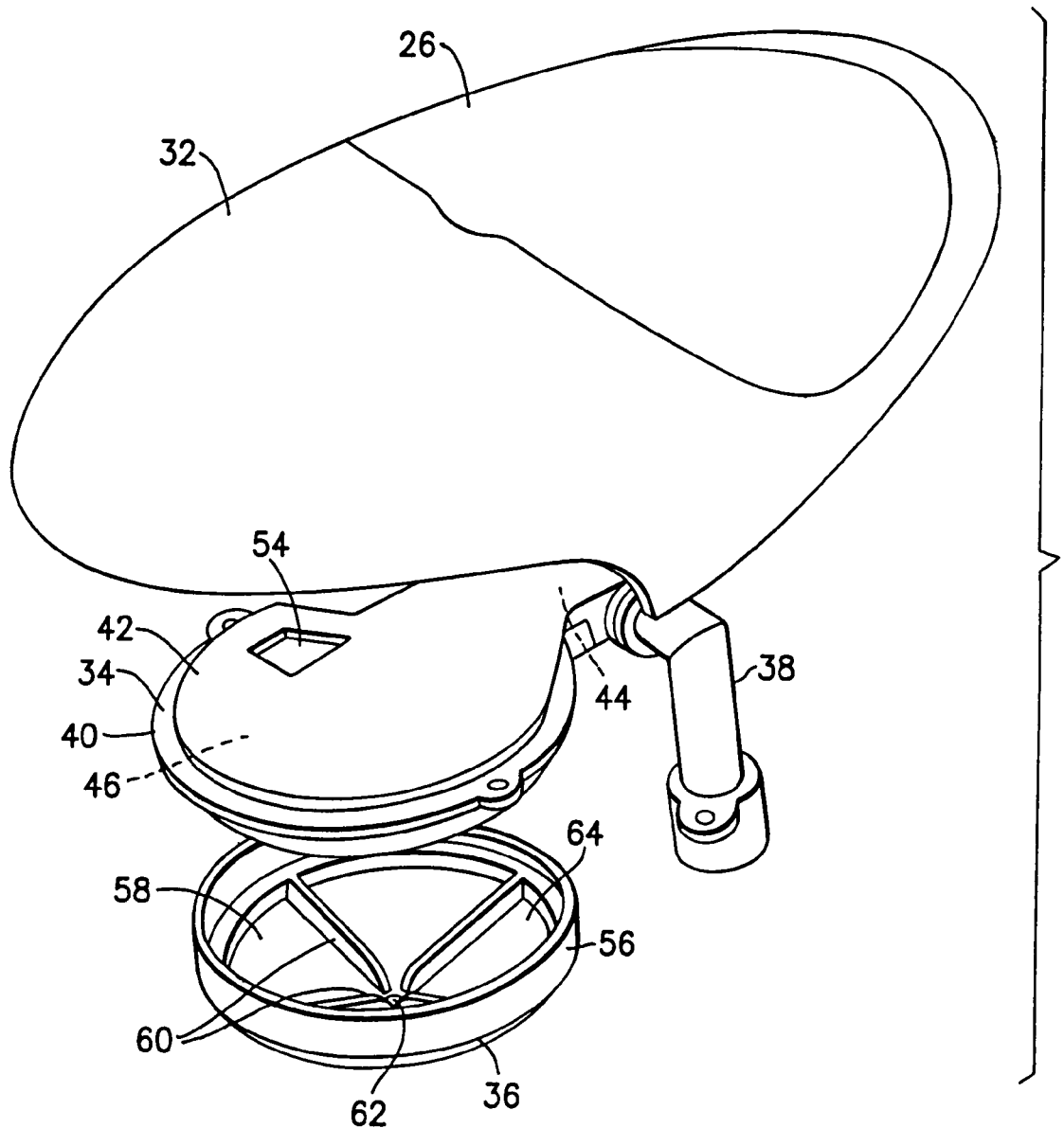
FIG. 4 is an exploded top perspective view of the components shown in FIG. 3.
Figure 5:
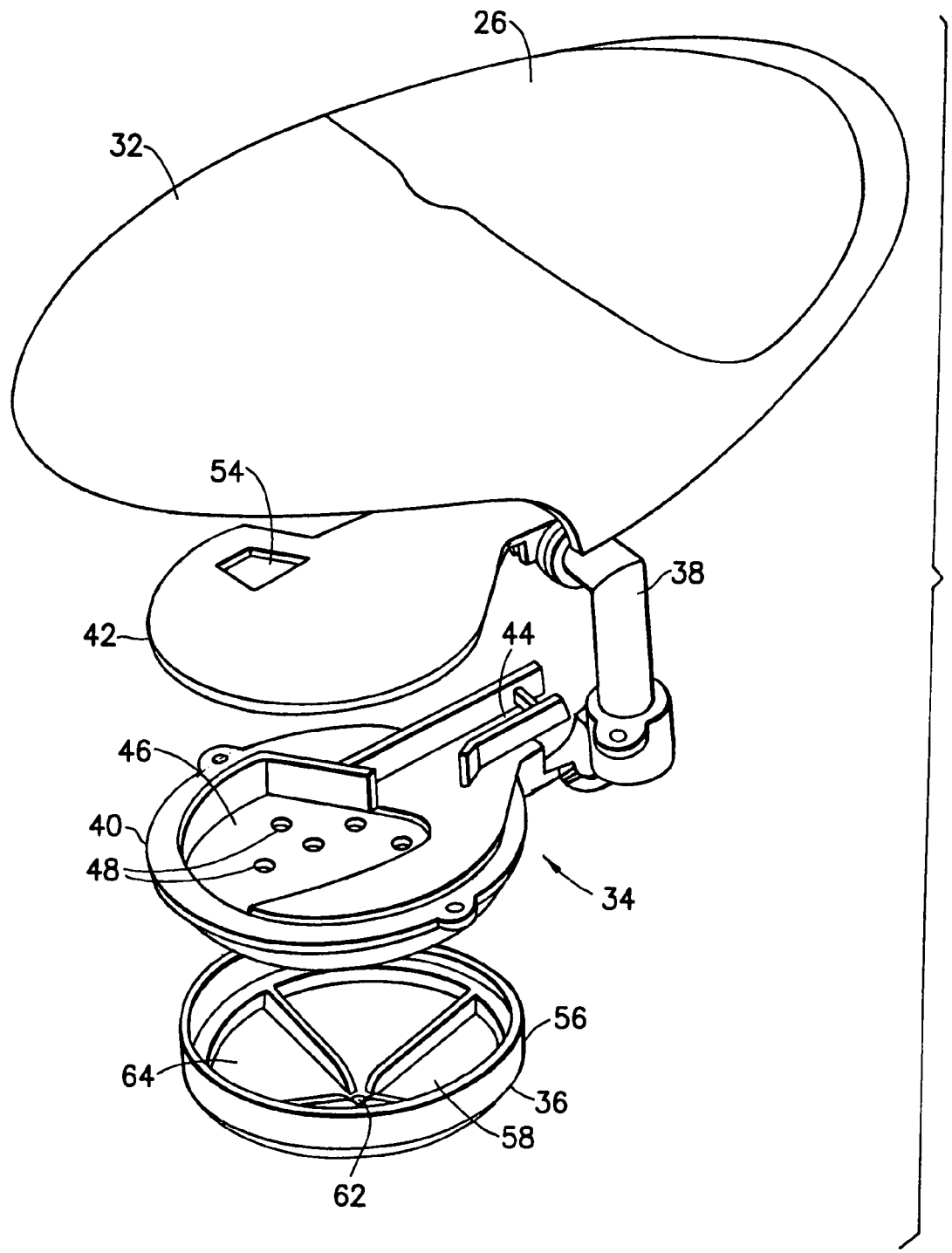
FIG. 5 is an exploded top perspective view of the components shown in FIG. 4 with the parts of the shower head further exploded.

Referring also to FIGS. 3-5, located above the brewing chamber 30 and beneath top 32 of the housing 12 is a shower head 34 and a diverter 36. The shower head 34 comprises an upward extending inlet pipe 38 from the heater 16, a bottom member 40 and a top member 42. The top and bottom members 40, 42 form an inlet channel 44 from the pipe 38 and a shower head chamber 46 at the end of the inlet channel. Heated water and steam or vapor from the water heater 16 can travel through the pipe 38, inlet channel 44 and into the shower head chamber 46. In this embodiment the shower head 34 is adapted to be stationarily attached to the underside of the top 32 at bosses 52 such as with screws (not shown). However, any suitable mounting arrangement could be provided.

The bottom member 40 of the shower head 34 has holes 48. The holes 48 extend from the shower head chamber 46 to the bottom side 50 of the bottom member 40. Water in the shower head chamber 46 is pushed out of the holes 48 in a downward direction by gravity and pressure from incoming new heated water. The number of the holes 48 and the size of the diameters of the holes 48 can control how fast water can flow out of the holes 48. Preferably the holes are large enough to prevent clogging from mineral deposits in the water over time. The pattern of the holes 48 can have any suitable pattern, but preferably are not aligned with the hole(s) in the diverter 36 as further described below.

The top member 42 of the shower head 34 substantially closes the top of the shower head chamber 46 and the inlet channel 44. However, the top member 42 comprises a hole 54. The hole 54 extends through to the top side of the top member 42. The hole 54 forms a gas/vapor/steam pressure release for the shower head chamber 46. More specifically, heated water from the heater 16 will enter the shower head chamber 46 under pressure. The hole 54 allows this pressure to be released such that water is not substantially pushed out of the bottom holes 48 by the pressure. However, in an alternate embodiment the release hole 54 might not be provided.

The diverter 36 is stationarily attached at the bottom of the shower head 34. As seen in FIG. 2, the diverter 36 is located at the top of the area 30. The diverter 36 generally comprises an upward extending perimeter wall 56, a bottom wall 58, and channel guides 60 on the top side of the bottom wall 58. This forms a chamber 64. The bottom wall 58 has a general conical shape extending in a downward direction. A single hole 62 extends through the bottom wall from the chamber 64 to the bottom side of the bottom wall.

The top of the chamber 64 is covered by the bottom side of the shower head 34. Thus, water from the holes 48 of the shower head 34 flows into the chamber 64 in a downward direction. The holes 48 are located vertically above the hole 62. However, the hole 62 is horizontally offset from the holes 48. Thus, the holes 62 and 48 are not vertically aligned with each other. Water entering the chamber 64 from the shower head 34 must first come into contact with the top side of the bottom wall 58, flow along the top side of the bottom wall 58, and then flow out the hole 62 in order to enter the brewing chamber 20. This arrangement decrease the velocity of the water exiting the shower head 34 before the water can enter the brewing chamber 20. More specifically, the water exiting the hole 62 is substantially gravity only feed towards the coffee pod in the brewing chamber 20. Steam can also cool slightly to condense back into liquid, also reducing pressure.

Figure 6:
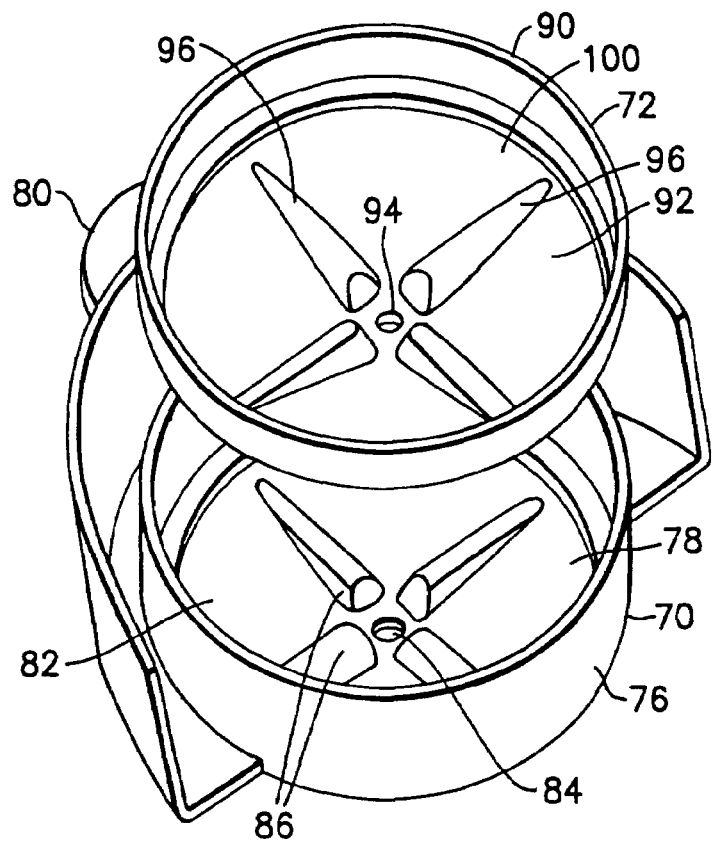
FIG. 6 is a top perspective view of the brewing chamber and pod carrier shown in FIGS. 1 and 2 with the two parts in an exploded position.
Figure 7:
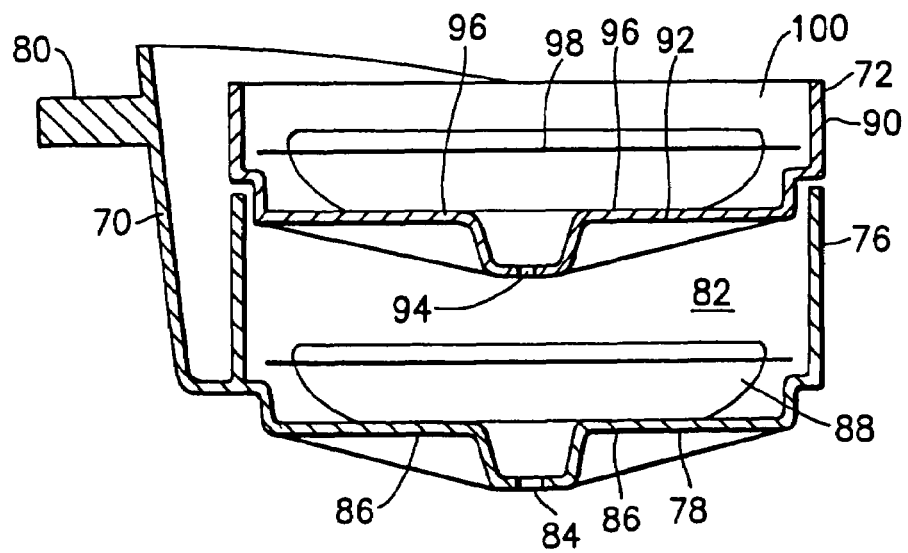
FIG. 7 is a cross sectional view of the brewing chamber and pod carrier shown in FIG. 6.
Figure 8:
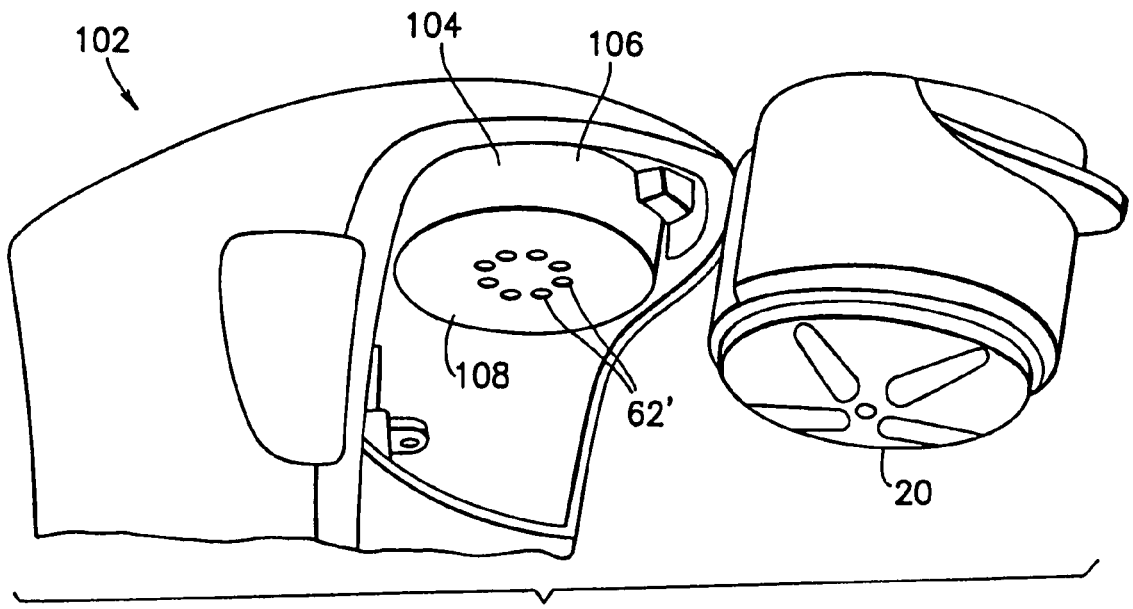
FIG. 8 is a perspective view of portions of an alternate embodiment of the present invention with the brewing chamber and pod carrier shown in an exploded position.
Figure 9:
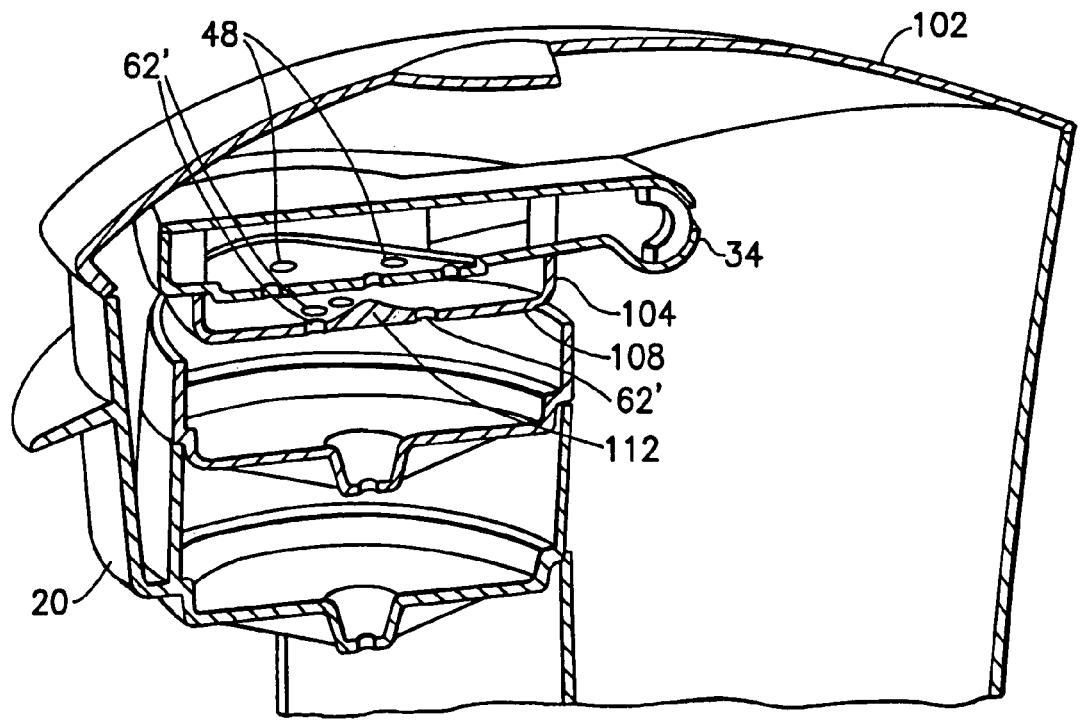
FIG. 9 is a perspective cross sectional view of the embodiment shown in FIG. 8.

As seen best in FIG. 2, the hole 62 is located in a centered position above the area 30. Thus, when the brewing chamber 20 is mounted in the area 30, water from the hole 62 can enter the brewing chamber at the center of the brewing chamber. Referring also to FIGS. 6 and 7, the brewing chamber 20, in this embodiment, comprises a coffee pod carrier comprising a first section 70 and a second section 72. The first section 70 is adapted to mechanically attach to the housing 12 in the receiving area 30 when inserted as indicated by arrow 74 in FIG. 2. The first section 70 comprises a perimeter wall 76, a bottom wall 78 and a handle 80. The perimeter wall 76 and bottom wall 78 form a first coffee pod chamber 82. The bottom wall 78 comprises a general downward conical shape with an outlet hole 84 at its center and pod support ribs 86 on its top side. The ribs 86 are adapted to support a first coffee grounds pod 88 thereon. In an alternate embodiment, more than one outlet hole 84 could be provided. In an alternative embodiment any suitable type of brewing chamber could be provided including, for example, a one-piece pod carrier or a pod carrier designed to carry only one pod or more than two pods.

The second section 72 is removably mounted or stacked on top of the first section 70. More specifically, the second section 72 can removably sit on the top side of the perimeter wall 76 and partially nests inside the first pod chamber 82. The second section 72 generally comprises a perimeter wall 90 and a bottom wall 92. The walls 90 and 92 form a pod chamber 100. The bottom wall 92 comprises a general downward conical shape with an outlet hole 94 at its center and pod support ribs 96 on its top side. The ribs 96 are adapted to support a second coffee grounds pod 98 thereon. In an alternate embodiment, more than one outlet hole 94 could be provided.

The two pod chambers 82, 100 form two brewing chambers for extracting coffee from the grounds in the pods 88, 98 into the water flowing through brewing chamber 20. More specifically, water from the diverted hole 62 can enter the second pod chamber 100 onto the top of the second pod 98. The water enters the second pod chamber 100 and the pod 98 substantially by gravity only feed. The water passes through the pod 98 and exits the chamber 100 at hole 94 by gravity only feed. The water, with coffee extracted from the pod 88, then enters the first pod chamber 82 onto the top of the first pod 88. The water enters the first pod chamber 82 and the pod 88 substantially by gravity only feed. The brewed coffee then exits the chamber 82 at hole 84 by gravity only feed. In an alternate method of use, the brewing chamber 20 might only be provided with a single coffee grounds pod 88 or 98 rather than two pods.

Coffeemakers that brew with the use of pods, but without pressure, are not previously known. Coffeemakers that brew with the use of pods have not been used for non-pressure pod-type brewers in the past. Coffeemakers that brew with the use of pods, such as BLACK & DECKER® HOME CAFÉ™ coffeemaker for example, use pressure to force the water through the pod. It uses a pump, flow meter, and electronic controls which increase cost and complexity of design. Additionally, brewing the pod under pressure increases the risk of leaks.

The coffeemaker shown in the drawings is preferably a drip type coffee maker adapted to use coffee pods, such as the coffee pods designed for BLACK & DECKER® HOME CAFÉ™ coffeemaker for example. Without using a pump and pressure chamber for the pod, such as in the BLACK & DECKER® HOME CAFÉ™ coffeemaker, it was previously thought to be difficult to channel the water through the pod(s) and achieve desirable extraction (brew strength) of the coffee. The force of the water directly out of the shower head onto the pod could causes the water to spray across the top of the pod and to the sides of the pod; bypassing the coffee. With a drip-type of system of the invention, using a baffle design to drip the water on the pod out of a single hole, extraction is increased. The water is preferably dripped so it penetrates the pod without saturation. Total saturation would otherwise allow bypass over the top of the pod.

The invention can decrease water bypass around a coffee pod, and increase extraction of the coffee, in a drip-type coffeemaker by diverting the water properly onto and through the pod at the correct force without using a pump or pressure. This solution eliminates costly parts and reduces complexity of design while maintaining the ease of use associated with coffee pods.

Similar to standard drip-type coffee makers, the invention can use a hot water generator that heats the water and pushes it through the shower head in pulses. The water can be pumped from the shower head out of a single hole, such as approximately 5 mm in diameter and 15 mm off center from the pod for example. However, in alternate embodiments any suitable dimensions could be provided. The invention can utilize a second chamber (provided by a diverter for example) under the shower head to divert the water properly onto the coffee pod at the correct locations, and with the correct force, so that water penetrates the coffee pod without substantially bypassing to the sides of the pod. The diverter can be located under the shower head.

In an alternate embodiment, it is desirable to drip the water out of multiple holes, onto different parts of the pod, to achieve maximum extraction without increased cost or complexity of design. Referring to FIGS. 8-10A one type of alternate embodiment of the invention is shown. In this embodiment the coffeemaker 102 is substantially identical to the coffeemaker 10 with the exception of the pattern of bottom holes 48 in the shower head 34 and the diverter 104. In this embodiment the diverter 104 is attached underneath the shower head 34 similar to the first embodiment described above. The diverter comprises a perimeter wall 106 and a bottom wall 108. The bottom wall 108 comprises a ring of holes 62' extending from the chamber 110 to the bottom side of the bottom wall. The bottom wall 108 also comprises an upward extending projection 112 in the center of the ring shape of holes 62'. The projection can be cone shaped. The holes 48 in the shower head are vertically mis-aligned with the holes 62' of the diverter. The projection 112 is located under a center one of the holes 48.

Similar to the first embodiment, in this embodiment the diverter functions to decrease the velocity of water entering the pod(s) in the brewing chamber 20. In addition, the pattern of the holes 62' and the projection 112 disperse the water in a predetermined pattern on the top surface of the pod located under the diverter. The diverter can divert the water properly onto the coffee pod at predetermined locations, and with the correct force, so that water penetrates the coffee pod without substantially bypassing to the sides of the pod.

Figure 10A:
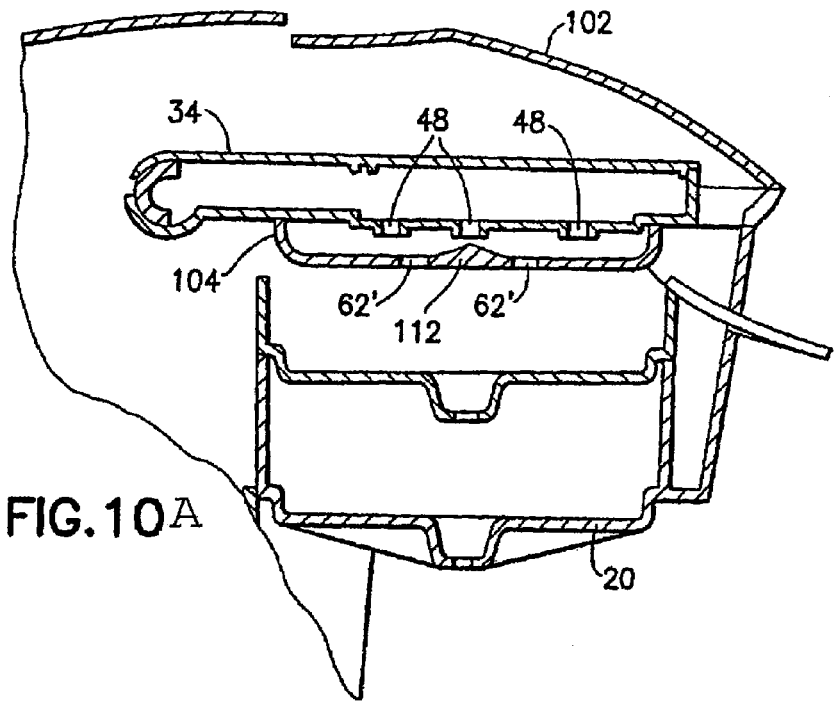
FIG. 10A is a side cross sectional view of the embodiment shown in FIGS. 8 and 9.
Figure 10B:
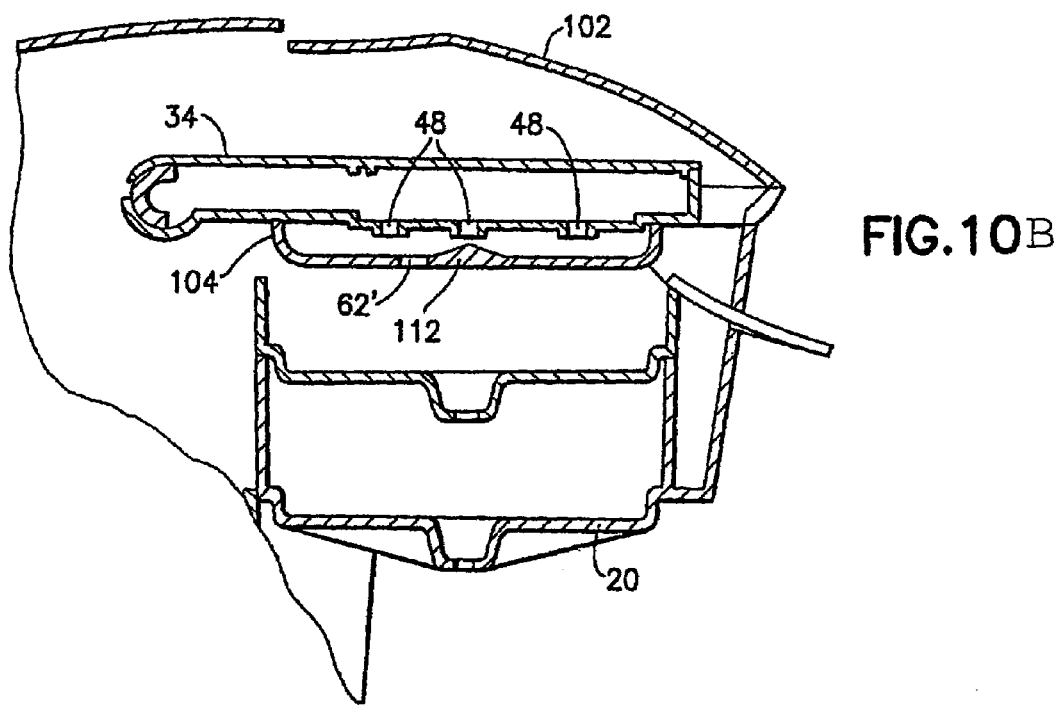
FIG. 10B is a side cross sectional view of another embodiment shown in FIGS. 8, 9, and 10A.

In another alternate embodiment similar to that depicted in FIGS. 8-10A, diverter 104 may have a single hole 62' and an upward extending projection 112 at or near the center of diverter 104, as depicted in FIG. 10B.

Figure 11A:
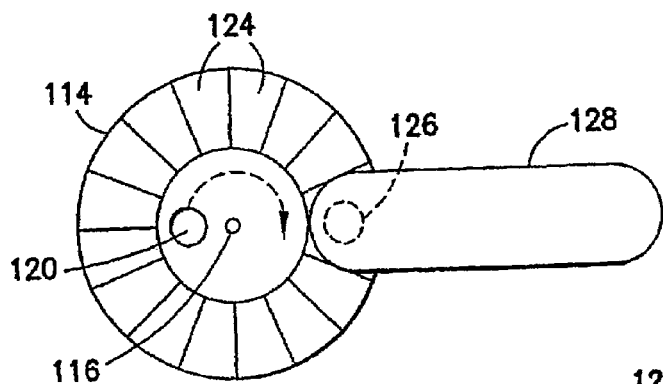
FIGS. 11A and 11B each depict a plan top view of components of alternate embodiments of the present invention.
Figure 12:
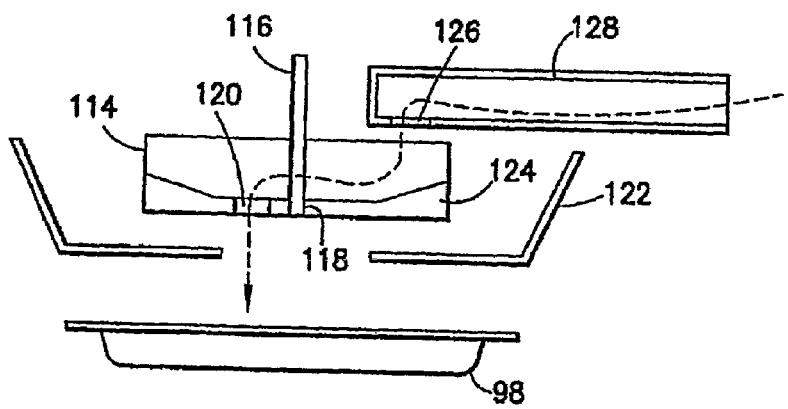
FIG. 12 is a schematic side view of the components shown in FIG. 11A showing water delivery onto multiple locations on the top surface of a pod through a single hole.

In an alternate embodiment, it is desirable to drip the water out of a single hole, but onto different parts of the pod to achieve maximum extraction without increased cost or complexity of design. Referring now to FIGS. 11A and 12 another example of an alternate embodiment is shown. In this embodiment the diverter 114 can be suspended on a spindle 116 through a hole 118 in the center of the diverter 114 allowing the diverter to spin freely. As an example of this embodiment, the diverter can be approximately 40 mm in diameter with a single 5 mm hole 120 (exit for water onto pod) placed 6.35 mm off center and an outer wall 122 to contain the water form splashing out of the wheel. However, in alternate embodiments any suitable dimensions could be provided. Just inside the outer wall and about 10 mm wide around the entire circumference are angled ribs 124 that, when installed, can sit directly under the single outlet hole 126 in the shower head 128. The pulsing action of the water from the shower head 128 onto the ribs 124 can spin the diverter wheel 114 slightly with each pulse. The water can then be directed down to the exit hole 120 in the diverter where it will then fall onto the pod 98 using only the force of gravity. Each time the water is pulsed from the shower head 128, the diverter 114 will spin and allow the water to fall onto a different portion of the pod 98. The water can penetrate the pod in a circular pattern about 12.75 mm on center for example. However, any suitable pattern and/or dimensions could be provided. This translates to an increased contact area of dripped water on the pod of approximately eight times (8×) the fixed baffle design with a measurable increase in extraction as well.

Figure 11B:
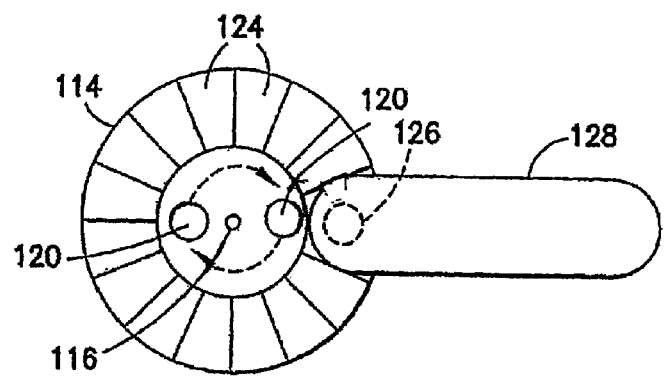

In another alternate embodiment similar to that depicted in FIGS. 11A and 12, the movable diverter 114 may have a plurality of holes 120, as depicted in FIG. 11B.

Figure 13:
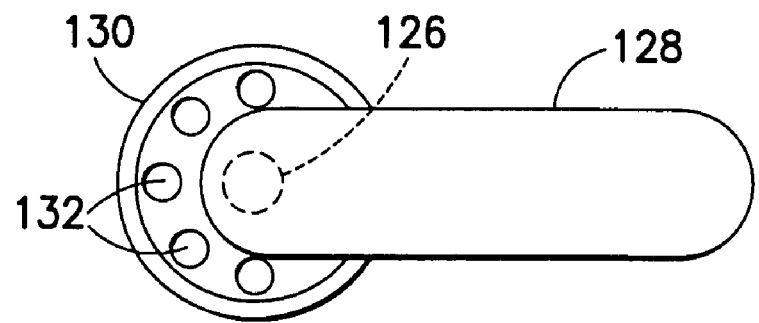
FIG. 13 is a plan top view of components of another alternate embodiment of the present invention.
Figure 14:
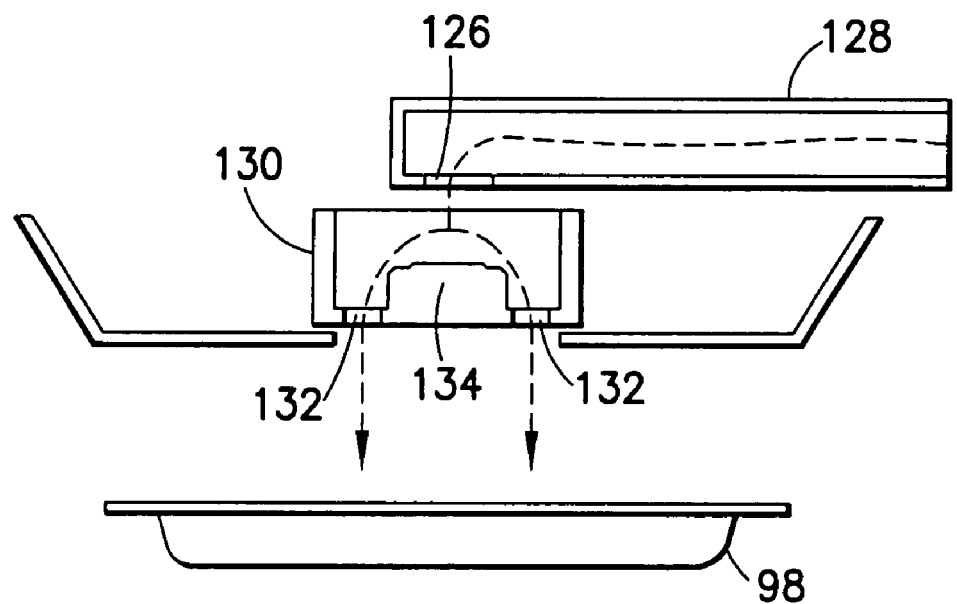
FIG. 14 is a schematic side view of the components shown in FIG. 13 showing water delivery onto multiple locations on the top surface of a pod through multiple holes.

Referring also to FIGS. 13-14, another option for the showerhead rotating diverter would be a fixed platform diverter 130 with openings 132 that allow the hot water to land onto the top surface of the pod 98 in the same geometry as described above. The holes 132 in this fixed platform can be offset from the outlet 126 of the showerhead 128 in order to slow down the velocity of the hot water when hitting the pod surface. An upward projection 134 can be provided below the outlet 126 to act as a stop/delaying surface to slow down the downward velocity of the water before it can exit the holes 132. The top surface of the projection 134 could be flat, slightly curved downward and outward, or have any other suitable shape.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:
1. A coffeemaker-comprising:
   a shower head comprising at least one first hole for dispensing water in a downward direction; and
   a diverter located below the shower head, wherein the diverter comprises a plurality of second holes for dispensing the water from the shower head in the downward direction towards a coffee grounds pod, wherein:

the diverter comprises a movable member adapted to be moved by water from the shower head;

the second holes are horizontally offset from the at least one first hole;

the diverter is adapted to decrease velocity of the water from the shower head; and wherein the diverter provides substantially gravity only feed of the water from the second holes towards the coffee grounds pod.

2. A coffeemaker as in claim 1 wherein the shower head comprises a gas and steam pressure hole separate from the at least one first hole to release gas and steam pressure from inside the shower head.

3. A coffeemaker as in claim 1 wherein the diverter comprises an elevated section inside a general ring shape formed by the second holes adapted to divert the water towards the second holes.

4. A coffeemaker as in claim 1 wherein the diverter comprises a rotable member.

5. A coffeemaker as in claim 1 further comprising a coffee pod carrier movably mounted under the diverter, wherein the coffee pod carrier comprises a first section adapted to hold a first coffee pod and a second section movably mounted above the first section which is adapted to separately hold a second coffee pod.

6. A coffeemaker as in claim 5 wherein the second section comprises a single central downward extending outlet into the first section.

7. A coffeemaker comprising:
a shower head comprising a plurality of first outlets for dispensing water out of the shower head for flow in a downward direction; and a diverter located at least partially below the shower head, wherein:
the diverter comprises a single second outlet for substantially gravity only feed of the water from the shower head in the downward direction towards coffee;
the single second outlet is horizontally offset relative to each of the plurality of first outlets to decrease velocity of the water from the shower head before the water exits the single second outlet; and
the diverter comprises at least one upward projection comprising a stop/delaying surface for the water to contact to thereby slow down the velocity of the water before the water can exit the at least one second outlet.

8. A coffeemaker comprising:
a shower head comprising a plurality of first outlets for dispensing water out of the shower head for flow in a downward direction; and a diverter located at least partially below the shower head, wherein:
the diverter comprises a single second outlet for substantially gravity only feed of the water from the shower head in the downward direction towards coffee;
the single second outlet is horizontally offset relative to each of the plurality of first outlets to decrease velocity of the water from the shower head before the water exits the single second outlet; and a coffee pod carrier movably mounted under the diverter, wherein the coffee pod carrier comprises a first section adapted to hold a first coffee pod and a second section movably mounted above the first section which is adapted to separately hold a second coffee pod.

* * * * *